UNITED STATES PATENT OFFICE 2,435,203

ACYLHYDRAZINO AMINO DERIVATIVES

Gaetano F. D'Alelio and James W. Underwood, Pittsfield, Mass., assignors to General Electric Company, a corporation of New York No Drawing. Application August 26, 1942, Serial No. 456,262

18 Claims. (Cl. 260—251)

This invention relates to new chemical compounds and more particularly to diazine derivatives. The invention especially is concerned with the production of new and useful acylhydrazino-substituted diazines.

The chemical compounds of this invention may be represented by the following general formula:

I

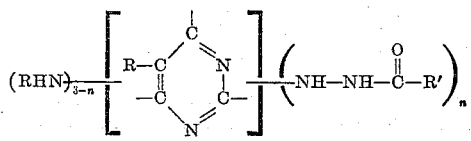

where $n$ represents an integer and is at least 1 and not more than 3, R represents a member of the class consisting of hydrogen and monovalent hydrocarbon and substituted hydrocarbon radicals, more particularly halo-hydrocarbon radicals, and R' represents a member of the class consisting of monovalent alipahtic hydrocarbon radicals and monovalent aromatic and nuclearly substituted, specifically nuclearly halogenated, aromatic hydrocarbon radicals. From the above formula it will be noted that when $n$ is 3 there will be no —NHR groups attached to the diazine nucleus.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiary-butylphenyl, methylnaphthyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc. Preferably R is hydrogen.

Illustrative examples of monovalent aliphatic and aromatic hydrocarbon radicals that R' in the above formula may represent are radicals such as above mentioned with reference to R. Illustrative examples of monovalent, nuclearly substituted, specifically nuclearly halogenated, aromatic hydrocarbon radicals that R' also may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like. Preferably R' represents a lower alkyl radical or a phenyl radical.

The new compounds of this invention may be used, for example, as pharmaceuticals, plasticizers and as intermediates in the preparation of derivatives thereof, e. g., methylol, methylene, etc., derivatives of the individual compound embraced by Formula I. These new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such condensation products are more fully described and are specifically claimed in our copending application Serial No. 456,260, filed concurrently herewith, now U. S. 2,392,837, issued January 15, 1946, and assigned to the same assignee as the present invention.

Various methods may be employed to produce the chemical compounds of this invention. One suitable method comprises effecting reaction, in the presence of a hydrohalide acceptor, between a diazine derivative corresponding to the general formula

II

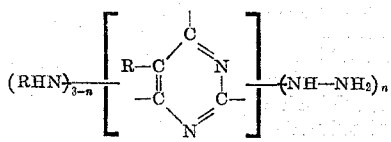

and an acyl halide corresponding to the general formula

III

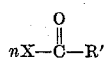

where X represents a halogen atom and $n$, R and R' have the same meanings as given above with reference to Formula I.

Illustrative examples of hydrazino-substituted diazines that may be employed, depending upon the particular end-product sought, are:

2-hydrazino 4,6-diamino pyrimidine
4-hydrazino 2,6-diamino pyrimidine (6-hydrazino 2,4-diamino pyrimidine)
2-hydrazino 4,6-di-(methylamino) pyrimidine
2-hydrazino 4,6-di-(ethylamino) pyrimidine
2-hydrazino 4,6-di-(isobutylamino) pyrimidine
2-hydrazino 4,6-di-(propenylamino) pyrimidine
2-hydrazino 4,6-di-(cyclohexylamino) pyrimidine
4-hydrazino 2,6-di-(anilino) pyrimidine
4-hydrazino 2,6-di-(toluido) pyrimidine
4-hydrazino 2,6-di-(xylidino) pyrimidine
4-hydrazino 2,6-di-(naphthylamino) pyrimidine
4-hydrazino 2,6-di-(benzylamino) pyrimidine
2-hydrazino 4,6-di-(ethylphenylamino) pyrimidine
2-hydrazino 4,6-di-(fluoroanilino) pyrimidine
2-hydrazino 4,6-diamino 5-methyl pyrimidine
4-hydrazino 2,6-diamino 5-phenyl pyrimidine
2-hydrazino 4-methylamino 6-amino pyrimidine
2-hydrazino 4-anilino 6-amino pyrimidine
2-hydrazino 4-anilino 6-methylamino pyrimidine
2-hydrazino 4,6 - di - (chloroethylamino) pyrimidine
4-hydrazino 2,6-diamino 5-methyl pyrimidine
4-hydrazino 2,6-di-(methylamino) pyrimidine
4-hydrazino 2,6-dianilino 5-ethyl pyrimidine
4-hydrazino 2,6-dianilino 5-chlorophenyl pyrimidine
2-hydrazino 4,6-dianilino 5-tolyl pyrimidine
4-hydrazino 2,6-di-(bromotoluido) pyrimidine
4-hydrazino 2,6 -di- (chloroethylamino) pyrimidine
2,4-dihydrazino 6-amino pyrimidine
4,6-dihydrazino 2-amino pyrimidine
2,4-dihydrazino 6-amino 5-methyl pyrimidine
4,6-dihydrazino 2-amino 5-phenyl pyrimidine
2,4-dihydrazino 6-methylamino pyrimidine
4,6-dihydrazino 2-ethylamino pyrimidine
2,4-dihydrazino 6-methylamino 5-chloroanilino pyrimidine
4,6-dihydrazino 2-allylamino pyrimidine
2,4-dihydrazino 6-fluoroanilino pyrimidine
4,6-dihydrazino 2-iodoanilino pyrimidine
2,4-dihydrazino 6-cyclohexylamino pyrimidine
2,4,6-trihydrazino pyrimidine
2,4,6-trihydrazino 5-methyl pyrimidine
2,4,6-trihydrazino 5-tolyl pyrimidine
2,4,6-trihydrazino 5-chlorophenyl pyrimidine Illustrative examples of acyl halides that may be used, depending upon the desired end-product, are:

Acetyl chloride (ethanoyl chloride)
Acetyl bromide
Acetyl iodide
Propionyl chloride
Propionyl bromide
Butyryl chloride
Valeryl chloride
Isovaleryl chloride
Propenoyl chloride
Butenoyl chloride
Capryl chloride
Benzoyl chloride
Chlorobenzoyl chlorides
Benzoyl bromide
Toluyl chlorides
Naphthoyl chloride
Chloronaphthoyl chlorides
3-bromotoluyl chlorides
2,4-dibromotoluyl chlorides
Dimethylbenzoyl chlorides
Ethylbenzoyl chlorides Various hydrohalide acceptors may be employed but we prefer to use a tertiary base, e. g., tertiary amines such as trialkyl (e. g., trimethyl, triethyl, tripropyl, tributyl, etc.) amines, triaryl (e. g., triphenyl, tritolyl, etc.) amines, pyrimidine, dimethyl aniline, etc. The reaction between the hydrazino-substituted diazine and the acyl halide may be carried out in any suitable manner, but preferably is effected in the presence of a suitable solvent or mixture of solvents. It is advisable to use an anhydrous medium, e. g., ether, benzene, toluene, etc., because of the high degree of reactivity of the acyl halide. The reaction may be carried out under a variety of temperature and pressure conditions, for instance at normal, sub-normal or at elevated temperatures and at atmospheric, sub-atmospheric or at super-atmospheric pressures.

The above reaction may be represented by the following general equation:

IV
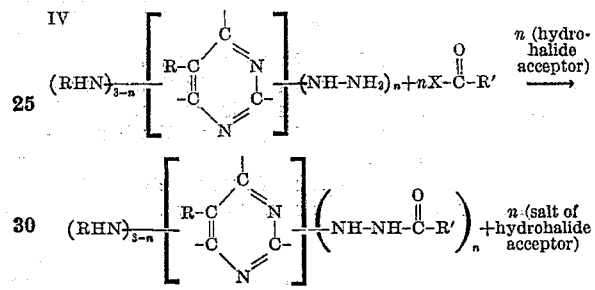

where X represents a halogen atom, and $n$, R and R' have the same meanings as given above with reference to Formula I.

Another method that is suitable for preparing many of the chemical compounds of this invention comprises effecting reaction between (1) an anhydride, if available, of an organic acid and (2) a hydrazino-substituted diazine. In general, the acid anhydrides employed are the lower members of the homologous series, e. g., the anhydrides of acetic, propionic, butanoic, butenoic, isobutanoic, valeric, isovaleric, caproic, benzoic, chlorobenzoic, bromobenzoic, toluic, 1-naphthoic and 2-naphthoic acids. This reaction preferably is carried out in a suitable solvent or mixture of solvents, e. g., ether, benzene, toluene, etc. The reaction conditions may be the same as described above with reference to the use of an acyl halide as a starting reactant, but ordinarily normal temperature and pressure conditions are preferred. The reaction may be represented by the following general equation:

V
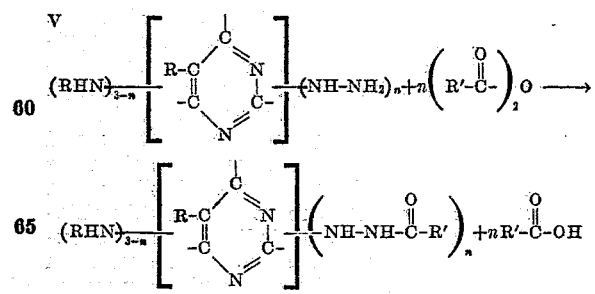

where $n$, R and R' have the same meanings as given above with reference to Formula I.

Another method that may be employed in preparing the new chemical compounds of this invention comprises effecting reaction between a halogenated diazine and a hydrazide (acyl hydrazine). This reaction preferably is carried out in the presence of a suitable solvent or mixture of solvents. A hydrohalide acceptor also preferably is present. The reaction may be represented by the following general equation:

VI
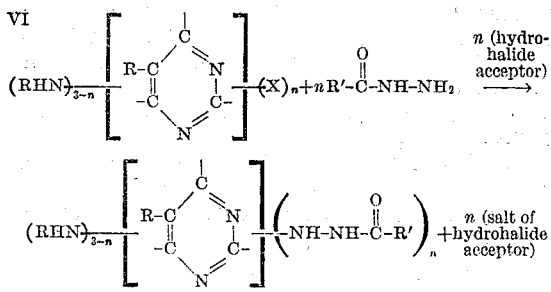

where X represents a halogen atom, and $n$, R and R' have the same meanings as given above with reference to Formula I. Preferably X is a chlorine or a bromine atom.

Another method that may be used in preparing chemical compounds of this invention comprises effecting an addition reaction between (1) ketenes of the general formula $R'_2$—C=C=O, where R' has the same meaning as given above with reference to Formula I and, in addition, hydrogen, and (2) a hydrazino-substituted diazine. This reaction may be represented by the following general equation:

VII
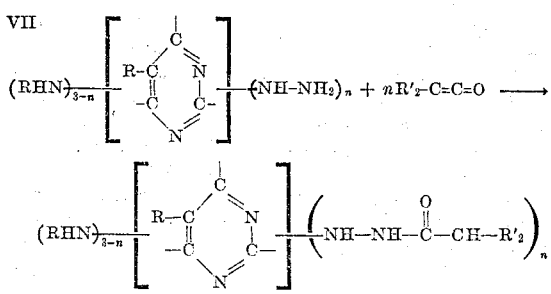

where $n$ and R have the same meanings as given above with reference to Formula I, and R' has the same meaning as given with reference to Formula I and, in addition, hydrogen.

In order that those skilled in the art better may understand how the present invention may be carried into effect, the following examples are given by way of illustration and not by way of limitation. All parts are by weight.

Example 1

This example illustrates the preparation of 4-acetylhydrazino 2,6-di-(methylamino) pyrimidine.

|  | Parts | Approx. Mol Ratio |
|---|---|---|
| 4-hydrazino 2,6-di-(methylamino) pyrimidine | 150 | 1 |
| Acetic anhydride | 91 | 1 |
| Ether | 250 |  |

The acetic anhydride was added slowly to the mixture of the other components. An exothermic reaction took place. After the reaction had subsided, the reaction flask was stoppered and shaken for 6 hours at room temperature. After standing for about 64 hours at room temperature, the precipitate comprising 4-acetylhydrazino 2,6-di-(methylamino) pyrimidine was filtered off, washed well with water and dried. A yield of 171 parts of the purified material was obtained.

Example 2

4-acetylhydrazino 2,6-diamino pyrimidine is prepared in essentially the same manner as described under Example 1 with the exception that 125 parts of 4-hydrazino 2,6-diamino pyrimidine are used in place of 150 parts of 4-hydrazino 2,6-di-(methylamino) pyrimidine.

Example 3

2-acetylhydrazino 4,6-di-(methylamino) pyrimidine is prepared in essentially the same manner as described under Example 1 with reference to the production of 4-acetylhydrazino 2,6-di-(methylamino) pyrimidine, which also may be named 6-acetylhydrazino 2,4-di-(methylamino) pyrimidine, with the exception that 150 parts of 2-hydrazino 4,6-di-(methylamino) pyrimidine are used in place of 150 parts of 4-hydrazino 2,6-di-(methylamino) pyrimidine.

Example 4

2-acetylhydrazino 4,6-diamino pyrimidine is prepared in essentially the same manner as described under Example 1 with the exception that 125 parts of 2-hydrazino 4,6-diamino pyrimidine are used in place of 150 parts of 4-hydrazino 2,6-di-(methylamino) pyrimidine.

Example 5

Di-(acetylhydrazino) amino pyrimidines, that is, 2,4-di-(acetylhydrazino) 6-amino pyrimidine and 4,6-di-(acetylhydrazino) 2-amino pyrimidine, are prepared in essentially the same manner as described under Example 1 with the exception that 138.4 parts of 2,4-dihydrazino 6-amino pyrimidine or of 4,6-dihydrazino 2-amino pyrimidine are used in place of 150 parts of 4-hydrazino 2,6-di-(methylamino) pyrimidine and the amount of acetic anhydride is increased to 182 parts. In other words, reaction is effected between the dihydrazino amino pyrimidine and acetic anhydride in the ratio of one mol of the former to approximately two mols of the latter.

Example 6

4,6-di-(acetylhydrazino) 2-methylamino pyrimidine is prepared in essentially the same manner as described under Example 1 with the exception that 150.9 parts of 4,6-dihydrazino 2-methylamino pyrimidine are used in place of 150 parts of 4-hydrazino 2,6-di-(methylamino) pyrimidine and the amount of acetic anhydride is increased to 182 parts.

Example 7

2,4,6-tri-(acetylhydrazino) pyrimidine is prepared in essentially the same manner as described under Example 1 with the exception that 151.8 parts of 2,4,6-trihydrazino pyrimidine are used in place of 150 parts of 4-hydrazino 2,6-di-(methylamino) pyrimidine and the amount of acetic anhydride is increased to 273 parts. In other words, reaction is effected between the trihydrazino pyrimidine and acetic anhydride in the ratio of one mol of the former to approximately three mols of the latter.

Example 8

4-propionylhydrazino 2,6-di-(methylamino) pyrimidine is prepared in essentially the same manner as described under Example 1 with the exception that 116 parts of propionic anhydride are used instead of 91 parts of acetic anhydride.

Illustrative examples of other chemical compounds embraced by Formula I that may be produced in accordance with the present invention are listed below:

2-propionylhydrazino 4,6-diamino pyrimidine
2-isobutanoylhydrazino 4,6-diamino pyrimidine
2-propenoylhydrazino 4,6-diamino pyrimidine
2-hexahydrobenzoylhydrazine 4,6-diamino pyrimidine
2-benzoylhydrazino 4,6-di-(methylamino) pyrimidine
2-toluylhydrazino 4,6-di-(ethylamino) pyrimidine
2-benzoylhydrazino 4,6-diamino pyrimidine
2-toluylhydrazino 4,6-diamino pyrimidine
4-ethylbenzoylhydrazino 2,6-di-(propenylamino) pyrimidine
4-dimethylbenzoylhydrazino 2,6-di-(cyclopentylamino) pyrimidine
2-diethylbenzoylhydrazino 4,6-dianilino pyrimidine
2-acetylhydrazino 4,6-di-(ethylamino) pyrimidine
4-acetylhydrazino 2,6-dianilino pyrimidine
4-acetylhydrazino 2,6-ditoluido pyrimidine
2-acetylhydrazino 4,6-di-(cyclopentylamino) pyrimidine
2-acetylhydrazino 4-methylamino 6-amino pyrimidine
2-acetylhydrazino 4-anilino 6-amino pyrimidine
2-acetylhydrazino 4-methylamino 6-anilino pyrimidine
4-acetylhydrazino 2,6-diamino 5-methyl pyrimidine
4-acetylhydrazino 2,6-di-(methylamino) 5-methyl pyrimidine
2-acetylhydrazino 4,6-diamino 5-phenyl pyrimidine
2-acetylhydrazino 4,6-dianilino 5-fluorophenyl pyrimidine
2-propionylhydrazino 4-methylamino 6-bromoanilino pyrimidine
2-propionylhydrazino 4-iodoanilino 5-phenyl 6-amino pyrimidine
2-propionylhydrazino 4,6-diamino 5-chlorobutyl pyrimidine
2-benzoylhydrazino 4-chloropropylamino 5-xylyl 6-anilino pyrimidine
2,4-di-(propionylhydrazino) 6-amino pyrimidine
2,4-di-(acetylhydrazino) 6-anilino pyrimidine
2,4-di-(acetylhydrazino) 5-methyl 6-methylamino pyrimidine
2,4,6-tri-(acetylhydrazino) 5-methyl pyrimidine
2,4,6-tri-(acetylhydrazino) 5-phenyl pyrimidine
2,4,6-tri-(propionylhydrazino) 5-ethyl pyrimidine
2,4,6-tri-(propionylhydrazino) 5-xenyl pyrimidine
2-acetylhydrazino 4-benzoylhydrazino 6-amino pyrimidine
2,4,6-tri-(benzoylhydrazino) pyrimidine
2,4-di-(chlorobenzoylhydrazino) 6-amino pyrimidine
2,4-di-(propionylhydrazino) 6-methallylamino pyrimidine
2-acetylhydrazino 4-propionylhydrazino 6-benzoylhydrazino pyrimidine
2,4-di-(acetylhydrazino) 6-propionylhydrazino pyrimidine
4-acetylhydrazino 2,6-di-(iodoanilino) pyrimidine
2-propionylhydrazino 4,6-di-(bromotoluido) pyrimidine
4-(bromobenzoylhydrazino) 2,6-di-(chloroanilino) 5-naphthyl pyrimidine
2-acetylhydrazino 4,6-di-(allylamino) pyrimidine
4-propionylhydrazino 2,6-di-(cyclohexenylamino) pyrimidine
4-acetylhydrazino 2,6-di-(octylamino) 5-pentyl pyrimidine
2,4-di-(butyrylhydrazino) 6-amino pyrimidine In a manner similar to that described above with particular reference to the production of the acylhydrazino-substituted pyrimidines (1,3- or meta-diazines), corresponding derivatives of the 1,2- or ortho-diazines (pyridazines) and of the 1,4- or para-diazines (pyrazines) may be prepared.

What we claim as new and desire to secure by Letters Patent of the United States is:

1. Chemical compounds corresponding to the general formula

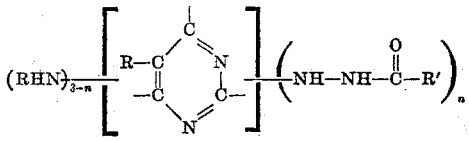

where $n$ represents an integer and is at least 1 and more than 3, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrogen radicals.

2. Chemical compounds as in claim 1 wherein R represents a hydrogen atom.

3. Chemical compounds as in claim 1 wherein R' represents an alkyl radical.

4. Chemical compounds as in claim 1 wherein R represents a hydrogen atom and R' represents an alkyl radical.

5. An acylhydrazino diamino pyrimidine.

6. An acetylhydrazino diamino pyrimidine.

7. 4-acetylhydrazino 2,6-diamino pyrimidine.

8. An acetylhydrazino di-(methylamino) pyrimidine.

9. 4-acetylhydrazino 2,6-di-(methylamino) pyrimidine.

10. A di-(acylhydrazino) amino pyrimidine.

11. A di-(acetylhydrazino) amino pyrimidine.

12. 4,6-di-(acetylhydrazino) 2-amino pyrimidine.

13. The method of preparing new pyrimidine derivatives which comprises effecting reaction between (1) a compound corresponding to the general formula

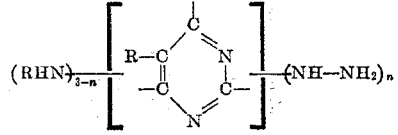

where $n$ represents an integer and is at least 1 and not more than 3, and R represents a member of the class consisting of hydrogen and monovalent hydrocarbon and halohydrocarbon radicals, and (2) a compound corresponding to the general formula

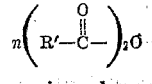

where $n$ has the meaning above given and

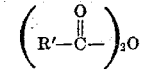

represents an anhydride of a carboxylic acid of the lower aliphatic, aromatic and nuclearly halogenated aromatic series.

14. The method of preparing an acetylhydrazino diamino pyrimidine which comprises effecting reaction between approximately equimolecular proportions of a hydrazino diamino pyrimidine and acetic anhydride.

15. The method of preparing 4-acetylhydrazino 2,6-di-(methylamino) pyrimidine which comprises effecting reaction between approximately equimolecular proportions of 4-hydrazino 2,6-di-(methylamino) pyrimidine and acetic anhydride.

16. The method of preparing a di-(acetylhydrazino) amino pyrimidine which comprises effecting reaction between a dihydrazino amino pyrimidine and acetic anhydride in the ratio of one mol of the former to approximately two mols of the latter.

17. The method of preparing 4-acetylhydrazino 2,6-di-(methylamino) pyrimidine which comprises effecting reaction in liquid state and in the absence of applied heat between 4-hydrazino 2,6-di-(methylamino) pyrimidine and acetic anhydride in approximately equimolecular proportions, and isolating and purifying the precipitate comprising 4-acetylhydrazino 2,6-di-(methylamino) pyrimidine that forms upon allowing the reaction mass to remain undisturbed at room temperature.

18. The method of preparing 4-acetylhydrazino 2,6-di-(methylamino) pyrimidine which comprises slowly adding acetic anhydride to a mixture of 4-hydrazino 2,6-di-(methylamino) pyrimidine and ether, the said acetic anhydride and 4-hydrazino 2,6-di-(methylamino) pyrimidine being employed in approximately equimolecular proportions, allowing the exothermic reaction which takes place to subside, thereafter agitating the reaction mass at room temperature for a period of the order of 6 hours, then allowing the mass to stand at room temperature for a longer period, filtering off the resulting precipitate comprising 4 - acetylhydrazino 2,6 - di - (methylamino) pyrimidine, washing the impure 4-acetylhydrazino 2,6-di-(methylamino) pyrimidine with water, and drying the washed material.

GAETANO F. D'ALELIO.
JAMES W. UNDERWOOD.

REFERENCES CITED

The following references are of record in the file of this patent:

UNITED STATES PATENTS

| Number | Name | Date |
|---|---|---|
| 2,231,836 | Zerwerck | Feb. 11, 1941 |

FOREIGN PATENTS

| Number | Country | Date |
|---|---|---|
| 495,514 | Great Britain | 1938 |
| 455,008 | Great Britain | 1935 |

OTHER REFERENCES

Fuson and Schriner, "Identification of Organic Compounds," 2d edition, 1940, pp. 114, 194, 195.